US009768635B2

(12) United States Patent
Khoury et al.

(10) Patent No.: US 9,768,635 B2
(45) Date of Patent: Sep. 19, 2017

(54) MANAGING BATTERY POWER UTILIZATION IN A MOBILE COMPUTING DEVICE

(71) Applicant: Microsoft Technology Licensing, LLC, Redmond, WA (US)

(72) Inventors: Issa Khoury, Redmond, WA (US); Peter Mikkola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 14/570,459

(22) Filed: Dec. 15, 2014

(65) Prior Publication Data

US 2016/0173666 A1 Jun. 16, 2016

(51) Int. Cl.
H04M 1/00 (2006.01)
H02J 7/00 (2006.01)
(Continued)

(52) U.S. Cl.
CPC ............ *H02J 7/007* (2013.01); *H04B 1/3883* (2013.01); *H04W 52/0264* (2013.01);
(Continued)

(58) Field of Classification Search
CPC ........... H04M 1/0262; H04M 1/72519; H04W 52/02; H04W 76/007; Y02E 60/12;
(Continued)

(56) References Cited

U.S. PATENT DOCUMENTS 7,528,577 B2    5/2009    Hara et al.
8,106,534 B2    1/2012    Spurlin et al.
(Continued)

FOREIGN PATENT DOCUMENTS

CN    201118879 Y    9/2008
WO    2006102928 A1    10/2006

OTHER PUBLICATIONS

Velazco, Chris, "Google's modular phones: hot-swapping batteries is just the beginning", Published on: Apr. 9, 2014, Available at: http://www.engadget.com/2014/04/09/project-ara-mdk/.
(Continued)

*Primary Examiner* — Charles Appiah
*Assistant Examiner* — Alexander Yi

(57) ABSTRACT

A mobile computing device has a processor and storage, connected to the processor and storing computer program instructions for an operating system for the computing device. The mobile computing device also may include a display and a communications radio. An electrical connection is provided for connection to a removable battery that provides power to the components of the mobile computing device. The mobile computing device also includes an auxiliary power source configured to provide power to the components of the mobile computing device when the removable battery is not supplying sufficient power. In response to the auxiliary power source being used, the operating system performs a set of actions that prioritize processes executed by the processor, manage power utilization by those processors, communicate information to the user about available power and, in some instances, gracefully degrade operation of the processes.

20 Claims, 4 Drawing Sheets

(51) Int. Cl.
*H04B 1/3883* (2015.01)
*H04W 52/02* (2009.01)

(52) U.S. Cl.
CPC ... *H04W 52/0277* (2013.01); *H04W 52/0296* (2013.01); *H02J 7/0063* (2013.01); *H02J 2007/0067* (2013.01); *Y02B 60/50* (2013.01)

(58) Field of Classification Search
CPC . H02J 7/0031; H02J 9/062; H02J 1/10; G05F 1/585; G01R 31/3648; G01R 19/16542; G06F 1/3203
USPC ............ 455/572, 574, 404.1, 566; 429/123; 320/103, 134, 128, 132, 135; 307/66, 24, 307/64, 43; 702/63; 324/427; 340/636.1, 636.13, 636.15; 713/300, 323
See application file for complete search history.

(56) References Cited

U.S. PATENT DOCUMENTS

| | | | |
|---|---|---|---|
| 8,339,105 B2 | 12/2012 | Maleyran et al. | |
| 8,533,509 B2 | 9/2013 | Kamijima | |
| 8,564,447 B2 | 10/2013 | Trock et al. | |
| 2003/0003972 A1* | 1/2003 | Sabat | H04M 1/677 455/574 |
| 2005/0168194 A1 | 8/2005 | Stanesti et al. | |
| 2007/0188144 A1* | 8/2007 | Hara | G06F 1/3203 320/132 |
| 2010/0058441 A1* | 3/2010 | Isokawa | G06F 21/6218 726/3 |
| 2010/0130263 A1 | 5/2010 | Zhang et al. | |
| 2010/0134305 A1 | 6/2010 | Lu et al. | |
| 2010/0279166 A1 | 11/2010 | Tseng | |
| 2011/0112782 A1 | 5/2011 | Majima et al. | |
| 2012/0161519 A1 | 6/2012 | Sutarwala et al. | |
| 2014/0059360 A1 | 2/2014 | Guthrie et al. | |
| 2016/0011914 A1* | 1/2016 | Bohn | G06F 9/5094 713/300 |

OTHER PUBLICATIONS

"Mobile Power Management to Change Battery without Hibernation or Re-booting", Published on: Apr. 1, 2000, Available at: https://priorart.ip.com/IPCOM/000013963.

* cited by examiner

Process list 300
    Process 302
        name 304
        status identifier 306
        real time communication 308
        communication session active? 310
        power consumption 312

Prioritization Settings 320
    Real-time communication 322
    Media playback 324
    Sleep applications first 326
    Terminate background applications 328

FIG.3

MANAGING BATTERY POWER UTILIZATION IN A MOBILE COMPUTING DEVICE

BACKGROUND

Users of battery-powered mobile communication devices, such as smart phones and tablet computers, generally are concerned about battery power running low during use of the device. For some users, the device is a primary computing and communications device for not only telephonic communications, but also messaging, email and entertainment, such as game playing, watch movies and television and other video product, listening to music, and reading books. For these users, the problem of having sufficient battery power substantially impacts daily life.

SUMMARY

This Summary is provided to introduce a selection of concepts in a simplified form that are further described below in the Detailed Description. This Summary is intended neither to identify key or essential features, nor to limit the scope, of the claimed subject matter.

A mobile computing device has a processor and storage, connected to the processor and storing computer program instructions that, when executed by the processor, provide an operating system for the computing device. A display is connected to the processor and the storage. The mobile computing device also may include a communications radio for wireless communication with a communication network. An electrical connection is provided for connection to a removable battery. The removable battery provides power to the processor, the storage and the display, and any communications radio, when connected to the electrical connection. The mobile computing device also includes an auxiliary power source configured to provide power to the processor, the storage, the display and any communications radio when the removable battery is not supplying sufficient power, such as when the removable battery is not connected to the electrical connection or has depleted. In response to the auxiliary power source being used, the operating system performs a set of actions that prioritize processes executed by the processor, manage power utilization by those processors, communicate information to the user about available power and, in some instances, gracefully degrade operation of the processes.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 3 is a diagram of example data structures for such an operating system.

DETAILED DESCRIPTION

Figure 1:
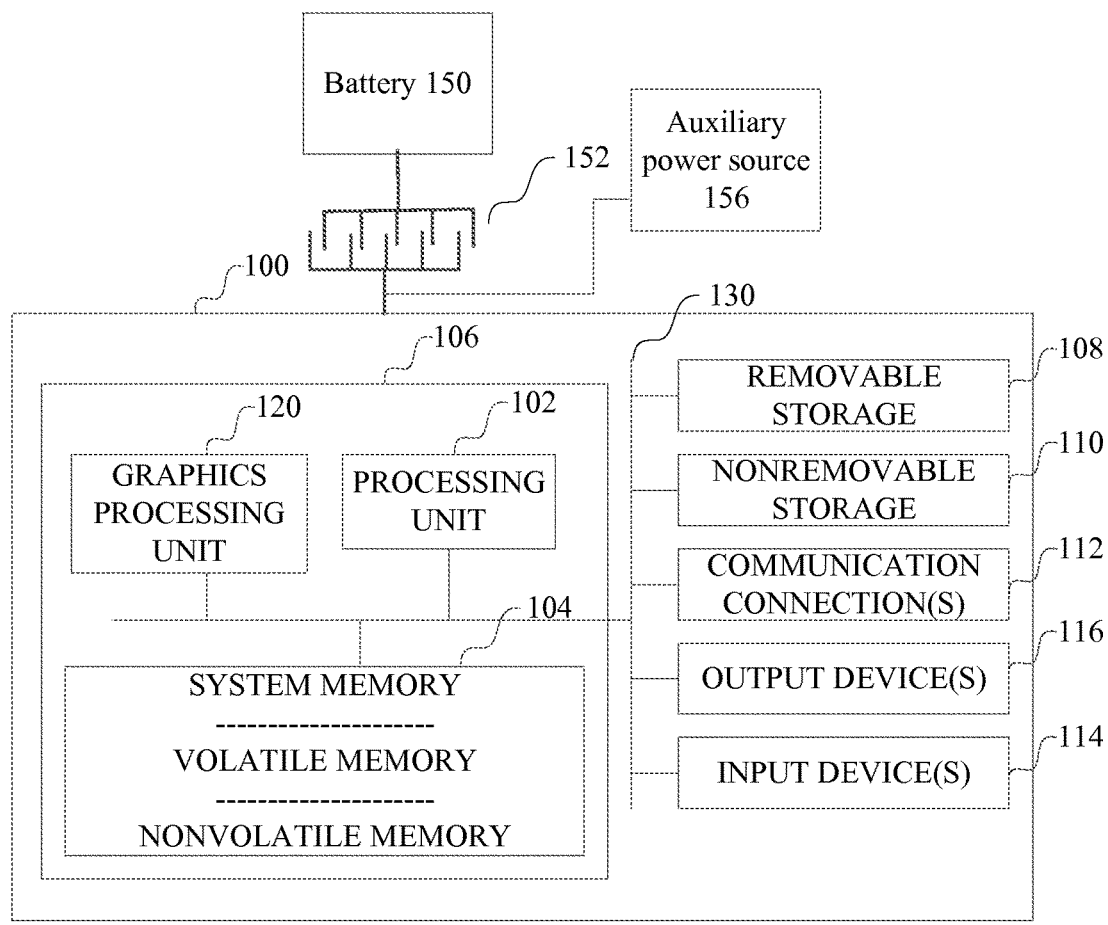
FIG. 1 is a block diagram of an example mobile communication device in which components of such a system can be implemented.

Referring to FIG. 1, an example implementation of a mobile communication device will now be described.

In FIG. 1, a mobile computing device generally incorporates a general purpose computer with computer programs providing instructions to be executed by a processor in the mobile computer device. Computer programs on a general purpose computer generally include an operating system and applications. The operating system is a computer program running on the computer that manages access to various resources of the computer by the applications and the operating system. The various resources generally include memory, storage, communication interfaces, input devices and output devices.

The mobile computing device can be any type of general-purpose or special-purpose primarily battery-powered computer, with one or more wireless communication radios, such as a tablet computer, hand held computer, smart phone, media player, personal data assistant, audio and/or video recorder, or wearable computing device.

FIG. 1 illustrates an example of computer hardware of a general purpose computer in which an operating system such as described herein can be implemented using computer programs executed on this computer hardware. The computer hardware can include any of a variety of general purpose or special purpose computing hardware configurations.

With reference to FIG. 1, an example general purpose computer 100 includes at least one processing unit 102 and memory 104. The computer can have multiple processing units 102 and multiple devices implementing the memory 104. A processing unit 102 can include one or more processing cores (not shown) that operate independently of each other. Additional co-processing units, such as graphics processing unit 120, also can be present in the computer. The memory 104 may include volatile devices (such as dynamic random access memory (DRAM) or other random access memory device), and non-volatile devices (such as a read-only memory, flash memory, and the like) or some combination of the two. This configuration of memory is illustrated in FIG. 1 by dashed line 106. The computer 100 may include additional storage (removable and/or non-removable) including, but not limited to, magnetically-recorded or optically-recorded disks or tape. Such additional storage is illustrated in FIG. 1 by removable storage 108 and non-removable storage 110. The various components in FIG. 1 are generally interconnected by an interconnection mechanism, such as one or more buses 130.

A computer storage medium is any medium in which data can be stored in and retrieved from addressable physical storage locations by the computer. Computer storage media includes volatile and nonvolatile memory devices, and removable and non-removable storage media. Memory 104 and 106, removable storage 108 and non-removable storage 110 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 100 may also include communications connection(s) 112 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 112 are devices, such as a network interface or radio transmitter, that interface with the communication media to transmit data over and receive data from signals propagated through communication media.

In a mobile communication device, there generally are one or more radio transmitters for telephonic communications over cellular telephone networks, or wireless communication interface for wireless connection to a computer network, to support voice communication. One or more processes may be running on the processor and managed by the operating system to enable voice communication. Such applications generally used input and output devices, as described below, such as a microphone, speakers, display and camera.

Computer 100 may have various input device(s) 114 such as a keyboard, mouse, pen, camera, microphone, touch input device, sensors, and so on. Output device(s) 116 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 110, communication connections 112, output devices 116 and input devices 114 can be integrated within a housing with the rest of the computer, or can be connected through various input/output interface devices on the computer, in which case the reference numbers 110, 112, 114 and 116 can indicate either the interface for connection to a device or the device itself as the case may be.

The various components shown in FIG. 1 are primarily powered by a battery 150. This battery is rechargeable and removable. Because it is removable, an electromechanical connection 152 connects the battery to a circuit (not shown) that powers the various components in FIG. 1. An auxiliary power source 156 also connects to the circuit. When the battery 150 is present, the auxiliary power source can be charged. When the battery 150 is absent, the auxiliary power source can power the components of FIG. 1.

Examples of the auxiliary power source include, but are not limited to, a battery, a capacitor or some similar element that holds a charge, a solar panel on the phone that can provide a bit of charge to run in this auxiliary mode, or an electro-mechanical device, such as a piezoelectric device, that can generate some charge.

The mobile computing device generally has a housing in which the components of FIG. 1 are contained. The housing can include any form of mechanical device or devices which facilitate removal or insertion or electrical connection of the removable battery 150.

Generally speaking, the operating system of the computer is reactive to whether the auxiliary power source is active. Various sensors (not shown) in the circuit of FIG. 1 can provide, to the processor, information about how much power is available from the auxiliary power source and whether the auxiliary power source is active. When the auxiliary power source is active, the mobile computing device will have a limited amount of power available. In general, the user is informed, through information provided on an output device, that the battery 150 needs replacement or charging. In some instances, the battery may have been removed and may be in the process of being replaced or charged.

The utilization of the auxiliary power source can be configured to be an event or interrupt or other signal or message that the operating system detects. In response to the auxiliary power source being used, the operating system performs a set of actions that prioritize processes executed by the processor, manage power utilization by those processors, communicate information to the user about available power and, in some instances, gracefully degrade operation of the processes.

Figure 2:
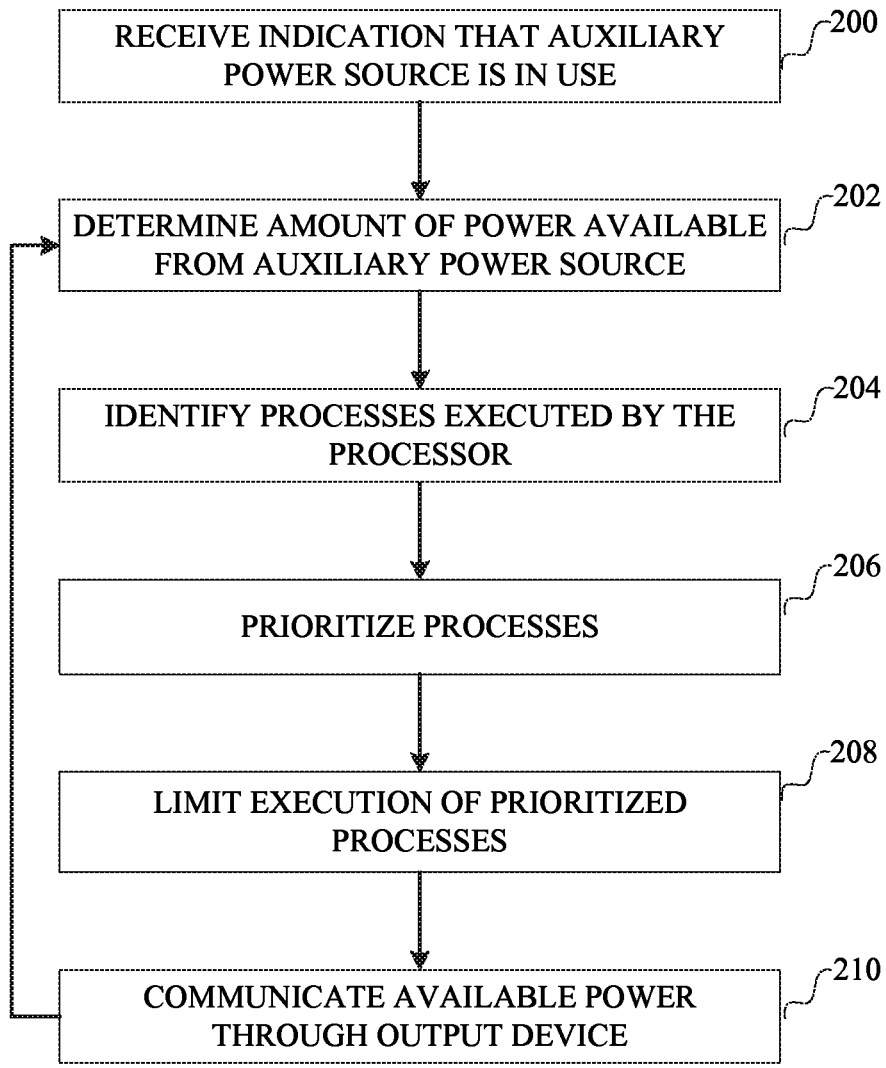
FIG. 2 a flow chart describing operation of an example implementation of an operating system of a mobile communication device.

Referring now to FIG. 2, a flowchart describing general operation of the operating system will now be described.

The process described in FIG. 2 is invoked when the operating system receives 200 an indication that the auxiliary power is being used. In response to such an indication, the operating system determines 202 an amount of power available from the auxiliary power source. Also, the operating system identifies 204 the processes executed by the processor. The operating system generally maintains a list of all currently executing processes, including an indication of a user profile with which each process is associated and various status information and other metadata about those processes.

The identified processes are prioritized 206 according a combination of prioritization settings and corresponding values associated the processes.

For example, there may be one or more priority levels for processes. For example, prioritization settings can indicate that processes supporting real time communications can be prioritized over some other processes. Each process can have one or more associated parameters that indicate whether that process supports real time communications. As another example, prioritization settings can indicate that processes that have currently active real time communications are prioritized over other processes. Each process can have one or more associated parameters that indicate whether that process supports real time communication and is currently active. Such settings also can indicate that there are multiple data streams, each of which has its own priority setting. For example, a video telephony application may indicate that the audio stream has a higher priority than the video stream. As another example, the video stream can be given a priority level that would allow the video stream to be paused or stopped.

As another example, prioritization settings can indicate that processes supporting entertainment applications, such as media playback (e.g., video or music) or games, can be stopped or paused when the auxiliary power source is being used, or the quality of the output stream can be reduced if that reduces power consumption. A user can thus be given time to swap the battery and then resume the paused entertainment application. Each process can have one or more associated parameters that indicate whether that process is an entertainment application, and optionally any subtype of application (e.g., game, video playback, audio-only playback, etc.). Additional parameters can include information about how much power the process consumes when active or when paused. As another example, prioritization settings can indicate that processes that have currently active entertainment usage can be stopped our paused, or media output quality can be reduced, when the auxiliary power source is being used. Each process can have one or more associated parameters that indicate whether that process supports an entertainment application, and optionally any subtype of this kind of application, and whether that process is currently active.

Processes also can be prioritized by sorting the processes by amount of power consumed by each process, and then within different tiers of power consumers, prioritizing the processes in terms of user experience, favoring processes supporting real time communications.

Using the prioritized list of processes, the operating system can limit 208 execution of one or more of the processes according to environmental parameters. The environmental parameters can include, for example, the amount of remaining power from the auxiliary power source, the temperature, whether a real time communication process is currently active, modes in which processes are currently running, such as "active", "background" and the like.

As an example, if amount of remaining power from the auxiliary power source drops below a threshold, all inactive processes can be terminated. As another example, if the amount of remaining power from the auxiliary power source drops below another threshold, all processes except those supporting real time communications can be changed from active to background status, or terminated. As another example, if the amount of remaining power from the auxiliary power source drops below another threshold, power to additional components of the mobile computing device, such as any radio transmitter not being used for communication, camera, or display can be turned off. As another example, if the amount of remaining power from the auxiliary power source drops below yet another threshold, a hibernation processes can be initiated to place the mobile computing device in a hibernating state. In some implementations, data can be communicated through an output device that can be perceived by a user to communicate that the execution of one or more processes is about to become limited.

As another step in this process, the operating system also can determine 210, and communicate through the output devices, a measure of the remaining power from the auxiliary power source. If an estimate of power consumption is available for each process, this measure can be, for example, an amount of time remaining before the auxiliary power source is depleted. As another example, this measure can be a percentage of the amount of power available from the auxiliary power source.

It should be understood that the invention is not limited to the sequence of steps shown in FIG. 2. For example, the communication of the available power through the output device can occur at any time. Identification of the processes may be performed once, and can be generally maintained by the operating system. Further, the list of processes may already be prioritized, by the nature of the process used to limit execution of the processes using prioritization settings in the operating system.

In general, when the auxiliary power source is powering the computing device, the operating system is programmed to periodically evaluate the current processes with respect to the power available from the auxiliary power source, prioritization settings and environmental parameters, and then take actions to limit execution of the current processes. This periodic evaluation is illustrated in FIG. 2 by the return to step 202. Such an operation can be scheduled within the operating system, for example, as a thread that is scheduled to execute upon detection of an event or interrupt, or after passage of an amount of time.

When the auxiliary power source is not powering the computing device, the auxiliary power source may be charged, if it is a rechargeable source. If a new main battery is inserted or if the main battery of the computing device is being charged in the device, power from the main battery or a charging source may charge the auxiliary power source. In some cases the auxiliary power source may be charged, or may be generating power, while it is being used, as may be the case with a solar cell or an electromechanical device.

An example implementation of such an operating system can maintain data structures such as shown in FIG. 3 for tracking information about processes and tracking prioritization settings.

For example, a process list 300 is maintained by the operating system. For each process 302, the operating system maintains information, such as a name 304, a user session 306 with which the process is associated, and a status identifier 306, such as whether the process is active, or running in the background. Other data about the process may be stored, such as whether the process supports real time communication 308 and whether a communication session is active 310. An estimate 312 of its power consumption if used with the auxiliary power source can also be stored. Various other data also can be stored, including any data with which the operating system can perform prioritization.

Another data structure that can be stored includes prioritization settings 320. This data structure can take a variety of forms depending on the implementation of the operating system. For example, a value 322 can be stored to indicate how to prioritize real-time communication. A value 324 can be stored to indicate how to prioritize media playback. Another value 326 can indicate whether applications should be forced into a sleep or background mode first before termination. Another value 328 can indicate whether background applications can be simply terminated. It should be understood that these example value are merely illustrative and not intended to be either exhaustive or limiting.

Figure 4:
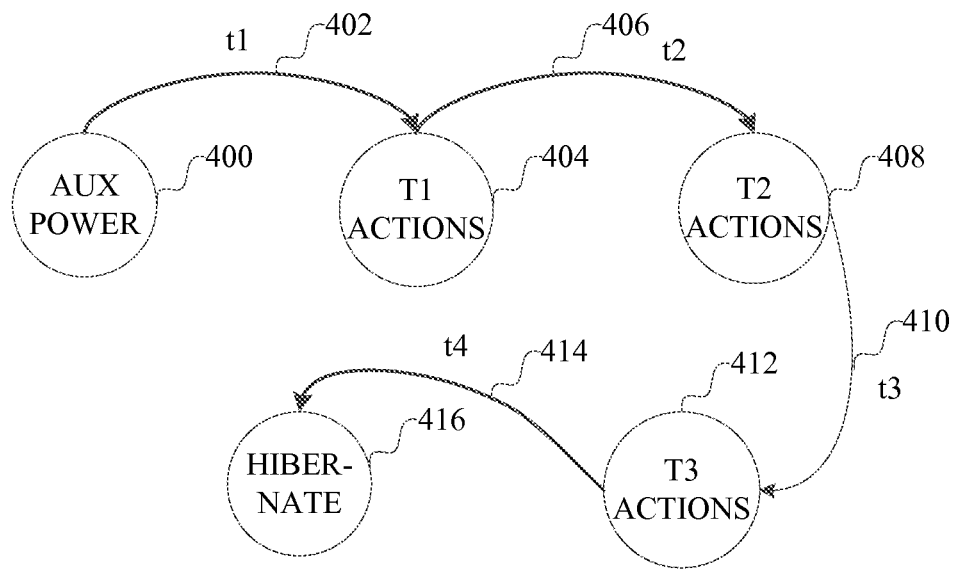
FIG. 4 is a state diagram of an example implementation of such an operating system.

FIG. 4 is a state diagram of an example implementation of such an operating system. Each state in the state diagram represents a state in which the operating system takes one or more actions to limit operation of a subset of the currently running processes.

The operating system also can have additional states (not shown) in which the mobile computing device is operating under other power modes. For example, the mobile computing device may be operating in a mode in which the main battery power is being used. Another state may indicate that the mobile computing device is connected to a power source that is charging the main battery. Additional states may be indicative of levels of power available in the main battery power. Transitions from such states to one of the states shown in FIG. 4 can occur under various conditions, such as the main battery being disconnected or depleted, and/or any charging power source being disconnected. In response to one of these conditions, which may be signaled to the operating system by an event or interrupt or the like, the operating system can transition to one of the states in FIG. 4. Similarly, in response to signal, such as an event or interrupt, indicating the connection of a sufficiently charged battery or connection to another power source, transitions from one of the states in FIG. 4 to another processing state based on the main battery or charging power source, can occur. Prior to transitioning to one of the states in FIG. 4, the states of the various applications can be stored. Upon a transition back from one of the states in FIG. 4, the stored states of the various applications can be used to restore the operation of the mobile computing device to its original state.

As a specific example, in FIG. 4, the operating system is in a first state 400 indicating that the auxiliary power source has full power. If the power drops below a threshold t1, a transition 402 occurs to a next state 404. In this state, for example, inactive processes can be terminated. If the amount of remaining power from the auxiliary power source drops below a threshold t2, then a transition 406 occurs to a next state 408. In this state, for example, non-real time communication applications can be put in a background mode or terminated. If the amount of remaining power from the auxiliary power source drops below a threshold t3, then a transition 410 occurs to a next state 412. In this state, for example, components that are not essential to real time communication can be powered down. If the amount of remaining power from the auxiliary power source drops below a threshold t4, then a transition 414 occurs to a next state 416. In this state, for example, the operating system can prepare to hibernate the mobile computing device.

In this state diagram, the transitions between states are based on the amount of remaining power from the auxiliary power source dropping below successive thresholds. Different state diagrams can be defined depending on different sets of actions to be taken at different thresholds applied to the amount of power available from the auxiliary power source. Additional states, or fewer states, can be used, depending on the implementation. Transitions from a more limited state to a less limited state also can occur if the auxiliary power source is capable of being charged or generating a charge.

The transitions between different states can be triggered by information other than, or in addition to, changes in the amount of power available from the auxiliary power source. For example, transitions can be based on remaining battery life in terms of time given currently running processes. This value might change as processes are terminated or components are powered down, resulting in additional transitions to other states if more time may be available. For example, transitions between states can be defined based on completion of limiting actions by the operating system, and performance of actions can be conditioned upon the amount of power available from the auxiliary power source.

The sets of actions performed in each state can vary depending on the implementation. For example, in some states, starting new processes may be limited or prevented. In this example, a message may be communicated to an output device indicating that the new process is not started until sufficient power is available to the device. As another example, in some states, media playback is paused. In some states, media playback may be allowed to continue, but with reduced quality output or a reduce number of streams to reduce power consumption. In yet other states, a media player process can be terminated. As another example, in some states, background synchronization processes can be stopped.

With such a system, battery power is more efficiently utilized for those applications and components that support operations that a typical user would prefer to have continue without interruption, such as real time communication.

Accordingly, in one aspect, a mobile computing device includes a processor and storage, connected to the processor and storing computer program instructions that, when executed by the processor, provide an operating system for the computing device. A display is connected to the processor and the storage. A communications radio for wireless communication with a communication network also is includes in the mobile computing device. An electrical connection is provided for connection to a removable battery. The removable battery provides power to the processor, the storage and the display when connected to the electrical connection. The mobile computing device also includes an auxiliary power source configured to provide power to the processor, the storage, the display and the communications radio when the removable battery is not supplying sufficient power to the processor, the storage and the display. The operating system, in response to the auxiliary power source being used, is configured to determine an amount of power available from the auxiliary power source and identify processes executed by the processor. The operating system prioritizes the processes, such that processes supporting real time communication by the computing device are higher priority than other processes. The operating system limits execution of one or more of the processes according to environmental parameters.

In any of the foregoing aspects, the operating system can determine a value indicative of an amount of power remaining for supporting running processes, and communicate the determined value through an output device, such as a display or an audio output.

In any of the foregoing aspects, the removable battery may not be supplying sufficient power to the processor, the storage and the display if the removable battery has been depleted. In any of the foregoing aspects, the removable battery may not be supplying sufficient power to the processor, the storage and the display if the removable battery has been disconnected from its electrical connection.

In any of the foregoing aspects, the operating system, in response to the removable battery being charged and connected to the electrical connection, returns limited processes to normal operation. In any of the foregoing aspects, the operating system, in response to the computing device being connected to a power source, returns limited processes to normal operation.

In any of the foregoing aspects, limiting execution of a process can include terminating the process.

In any of the foregoing aspects, limiting execution of a process can include pausing the process.

In any of the foregoing aspects, limiting execution of a process can include pausing processing of a stream of media processed by the process, while another stream of media continues to be processed.

In any of the foregoing aspects, the environmental parameters can include one or more of application type, an application subtype, user experience, power consumed by the application, amount of power available from the auxiliary power source.

In any of the foregoing aspects, the determined value can be an amount of time the running processes can run on remaining power.

In any of the foregoing aspects, the determined value can be a percentage of battery life.

In any of the foregoing aspects, the operating system, in response to the removable battery being charged and connected to the electrical connection, can return limited processes to normal operation.

In any of the foregoing aspects, the operating system can be further configured to continually monitor and update the environmental parameters, and further limit execution of the one or more processes according to the updated environmental parameters.

In any of the foregoing aspects, the operating system can transition to a state in which the operating system is managing applications based on the auxiliary power source in response to a change in available power to the mobile computing device. Such available power can include a main battery or a charging power source.

In any of the foregoing aspects, the operating system can transition from managing applications based on the auxiliary power source in response to a change in available power to the mobile computing device. Such available power can include a main battery or a charging power source.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

Each component (which also may be called a "module" or "engine" or the like), of a computer system such as described herein, and which operates on the computer, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It should be understood that the subject matter defined in the appended claims is not necessarily limited to the specific implementations described above. The specific implementations described above are disclosed as examples only.

What is claimed is:

1. A computing device, comprising, within a housing of the computing device:
   a processor;
   storage connected to the processor and storing computer program instructions that, when executed by the processor, provide an operating system for the computing device;
   a display connected to the processor and the storage;
   an electrical connection for connecting to a removable battery, the removable battery providing power to the processor, the storage and the display when connected to the electrical connection;
   an auxiliary power source configured to provide power to the processor, the storage and the display when the removable battery is not supplying sufficient power to the processor, the storage and the display;
   wherein the operating system, in response to the auxiliary power source being used, is configured to:
   a. determine an amount of power available from the auxiliary power source;
   b. identify currently executing processes by the processor and one or more data streams processed by the currently executing processes, wherein one or more of the data streams have priority settings;
   c. prioritize the currently executing processes to provide a prioritized list of the currently executing processes, such that currently executing processes supporting real time communication by the computing device are higher priority than other currently executing processes;
   d. limit execution of one or more of the currently executing processes according to environmental parameters and the prioritized list of the currently executing processes;
   e. limit processing of one or more of the data streams processed by the currently executing processes according to the priority settings of the one or more data streams;
   f. determine a value indicative of an amount of power remaining for supporting the currently executing processes;
   g. communicate the determined value through an output device of the mobile communicate device.

2. The computing device of claim 1, wherein to limit execution of a process the operating system is further configured to terminate the process.

3. The computing device of claim 1, wherein to limit execution of a process the operating system is further configured to pause the process.

4. The computing device of claim 1, wherein the environmental parameters comprises one or more of application type, an application subtype, user experience, power consumed by the application, and amount of power available from the auxiliary power source.

5. The computing device of claim 1, wherein the determined value is an amount of time the running processes can run on remaining power.

6. The computing device of claim 1, wherein the determined value is a percentage of battery life.

7. The computing device of claim 1, wherein the operating system is further configured to, in response to the removable battery being charged and connected to the electrical connection, return limited processes to normal operation.

8. The computing device of claim 1, wherein the operating system is further configured to:
   continually monitor and update the environmental parameters; and
   further limit execution of the one or more processes according to the updated environmental parameters.

9. An article of manufacture comprising:
   at least one memory device or storage device,
   computer program instructions stored on the at least one memory device or storage device which, when processed by a computer, instructs the computer to provide an operating system for the computer, wherein the computer is housed within a housing and comprises a processor, wherein the storage is connected to the processor, a display connected to the processor and the storage, an electrical connection for connecting to a removable battery, the removable battery providing power to the processor, the storage, and the display when connected to the electrical connection, and an auxiliary power source configured to provide power to the processor, the storage and the display when the removable battery is not supplying sufficient power to the processor, the storage and the display, wherein the operating system, in response to the auxiliary power source being used, is configured to:
   a. determine an amount of power available from the auxiliary power source;
   b. identify currently executing processes by the processor and one or more data streams processed by the currently executing processes, wherein one or more of the data streams have priority settings;
   c. prioritize the currently executing processes to provide a prioritized list of the currently executing processes, such that currently executing processes supporting real time communication by the computing device are higher priority than other currently executing processes;
   d. limit execution of one or more of the currently executing processes according to environmental parameters and the prioritized list of the currently executing processes;
   e. limit processing of one or more of the data streams processed by the currently executing processes according to the priority settings of the one or more data streams;
   f. determine a value indicative of an amount of power remaining for supporting the currently executing processes;
   g. communicate the determined value through an output device of the mobile communicate device.

10. The article of manufacture of claim 9, wherein to limit execution of a process the operating system is further configured to terminate the process.

11. The article of manufacture of claim 9, wherein to limit execution of a process the operating system is further configured to pause the process.

12. The article of manufacture of claim 9, wherein the environmental parameters comprises one or more of application type, user experience, power consumed by the application, and amount of power available from the auxiliary power source.

13. The article of manufacture of claim 9, wherein the determined value is an amount of time the running processes can run on remaining power.

14. The article of manufacture of claim 9, wherein the determined value is a percentage of battery life.

15. The article of manufacture of claim 9, wherein the operating system is further configured to, in response to the removable battery being charged and connected to the electrical connection, return limited processes to normal operation.

16. The article of manufacture of claim 9, wherein the operating system is further configured to:
   continually monitor and update the environmental parameters; and
   further limit execution of the one or more processes according to the updated environmental parameters.

17. A process performed by an operating system of a computer, wherein the computer is housed within a housing and comprises a processor, wherein the storage is connected to the processor, a display connected to the processor and the storage, an electrical connection for connecting to a removable battery, the removable battery providing power to the processor, the storage, and the display when connected to the electrical connection, and an auxiliary power source configured to provide power to the processor, the storage and the display when the removable battery is not supplying sufficient power to the processor, the storage and the display, wherein the process performed by the operating system, in response to the auxiliary power source being used, comprises:
   a. determining an amount of power available from the auxiliary power source;
   b. identifying currently executing processes by the processor and one or more data streams processed by the currently executing processes, wherein one or more of the data streams have priority settings;
   c. prioritizing the currently executing processes to provide a prioritized list of the currently executing processes, such that currently executing processes supporting real time communication by the computing device are higher priority than other currently executing processes;
   d. limiting execution of one or more of the currently executing processes according to environmental parameters and the prioritized list of the currently executing processes;
   e. limiting processing of one or more of the data streams processed by the currently executing processes according to the priority settings of the one or more data streams;
   f. determining a value indicative of an amount of power remaining for supporting currently executing processes;
   g. communicating the determined value through an output device of the mobile communicate device.

18. The process of claim 17, wherein limiting execution of a process comprises terminating the process.

19. The process of claim 17, wherein limiting execution of a process comprises pausing the process.

20. The process of claim 17, wherein the environmental parameters comprises one or more of application type, user experience, power consumed by the application, and an amount of power available from the auxiliary power source.

* * * * *